Figure 1:
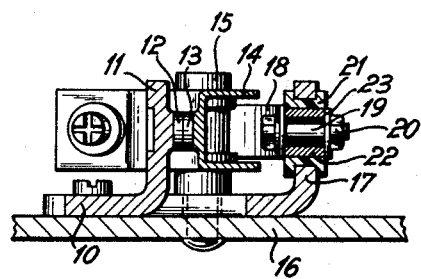

July 13, 1965  O. STIERLE  3,194,901
INSULATED MOUNTING FOR ELECTRICAL CONDUCTORS
Filed June 7, 1961

INVENTOR
Otto Stierle
by Michael S. Striker
Attorney

United States Patent Office 3,194,901
Patented July 13, 1965

3,194,901
INSULATED MOUNTING FOR ELECTRICAL
CONDUCTORS
Otto Stierle, Echterdingen, Kreis Esslingen, Germany,
assignor to Robert Bosch G.m.b.H., Stuttgart, Germany
Filed June 7, 1961, Ser. No. 115,480
Claims priority, application Germany, June 11, 1960,
B 58,197
10 Claims. (Cl. 200—30)

The present invention relates to electrical mountings.

More particularly, the present invention relates to a structure for connecting conductors to part of a switch assembly such as that used in an interruptor for an internal combustion engine.

In electrical assemblies of this type there is a problem involved in connecting electrical conductors to a wall of the assembly by way of a bolt or the like which passes through the wall with the conductors respectively located on opposite sides of the wall. The difficulty arises primarily because the connection is made to an electrically non-conductive material which is carried by the wall in its opening and which is subject to substantial changes in its condition due to increases and decreases in humidity and temperature, such electrically non-conductive material having very poor dimensional stability so that due to dampness, dryness, increases in temperature, or extremely cold temperatures, the electrically non-conductive material will swell or contract and thus undesirably influence the electrical connection to the extent that under some circumstances it requires frequent replacement.

It is accordingly a primary object of the present invention to provide a structure of the above type which will overcome the above difficulties by providing an insulation for the electrically conductive elements with respect to the wall which carries them and at the same time providing a structure where these changes in humidity and temperature will have no influence on the electrical structure.

It is also an object of the present invention to provide a structure of the above type which is easily assembled and disassembled so that when parts require replacement it is a simple matter to disassemble and reassemble the structure of the invention.

It is furthermore an object of the present invention to provide a structure of the above type which will reliably and securely hold the parts in their assembled condition.

It is furthermore an object of the present invention to provide a structure of the above type which is extremely inexpensive.

With the above objects in view the invention includes, in a switch assembly of the type adapted to be used in internal combustion engine interruptors, or the like, a wall formed with an opening passing therethrough and an annular electrically non-conductive member carried by the wall in the opening thereof. A tubular metallic spacer member is located within and surrounded by the annular member, and the pair of electrical conductors are respectively located adjacent opposite ends of the tubular spacer member. A bolt means passes through the tubular member and fixes the ends of the conductors respectively to the ends of the tubular spacer member, so that in this way changes in conditions of the annular member which surrounds the tubular spacer member will have no influence on the electrical structure.

Figure 2:
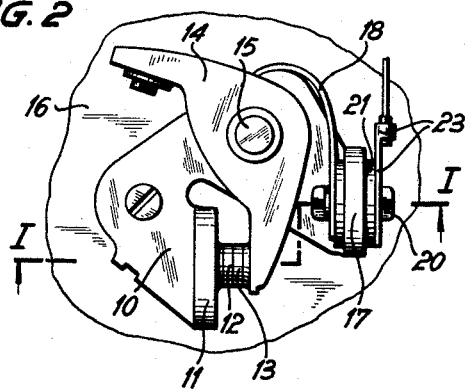

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevation of a structure according to the present invention, FIG. 1 being taken along line I—I of FIG. 2 in the direction of the arrows; and FIG. 2 is a top plan view of the structure of FIG. 1.

Referring now to the drawings, there is illustrated therein an interruptor switch assembly of the type which is adapted to form part of a distributor for an internal combustion engine. The switch assembly includes a stationary contact-carrying element 10 which is made from sheet metal and this metal is bent in such a way that the element 10 includes an upstanding lug 11 which carries the stationary contact 12 made, for example, of tungsten. This stationary contact 12 cooperates with a movable contact 13 which is carried by a movable contact-carrying element 14 which is turnably supported by a pivot 15 which passes freely through an opening in the stationary element 10 and which is riveted, for example, to the base plate 16 to which the stationary element 10 is also fixed. This element 10 has a second bent portion forming an upstanding lug 17, and this lug 17 forms a wall of the switch assembly which is formed with an opening passing therethrough. A leaf spring 18 which is riveted at one end to the movable contact-carrying element 14 has a free end portion extending along the wall 17 adjacent to its left face, as viewed in FIGS. 1 and 2. A bolt means formed by the bolt 19 and the nut 20 carried thereby serves to fix a free end of the leaf spring 18 to the wall 17 in a manner described in greater detail below. In order to electrically insulate the current which flows to the movable contact 13 through the leaf spring 18 and the bolt 19, the wall 17 carries an annular electrically non-conductive member 21 made of a thermoplastic resin, which may be synthetic, and this annular member 21 is in the form of a die casting which is molded directly onto the element 17 to provide the structure shown most clearly in FIG. 1, and the interior diameter of the annular member 21 is considerably larger than the diameter of the bolt 19 which passes therethrough, as is apparent from FIG. 1.

The thermoplastic element 21 will change its dimensions undesirably due to changes in temperature and humidity, and in order to prevent the connection provided by the bolt means 19, 20 from being influenced by the changes in the condition of the annular member 21, there is provided in accordance with the present invention a tubular spacer member 22 made of metal and located within and surrounded by the annular member 21. This tubular member 22 is rolled from a piece of sheet steel so as to form the tubular spacer element shown most clearly in FIG. 1, and the member 22 has a snug, relatively tight fit within the annular member 21 and this member 22 has its opposite end faces extending very slightly beyond the opposed end faces of the member 21, respectively. A free end of the leaf spring 18 engages the left end face of the tubular member 22, as viewed in FIG. 1, and the opposite end face of the tubular space member 22 is engaged by a cable connector element 23 which is connected electrically to the primary winding of the coil which supplies the current to the movable conductor 13 in a manner well known in the interruptor art. When the nut 20 is tightened, the clamping pressure provided by the bolt means 19, 20 serves to press the free end of the spring 18 and the cable connector 23 respectively against the opposed end faces of the tubular spacer member 22 so as to provide a good electrical connection, and with this construction the member 21 itself is not compressed in any way nor is it placed under any stress due to the electrical connections, so that any changes in the condition of the element 21 will not have any undesirable influence on the electrical connection. Thus, with the structure of the invention the plastic insulating element 21 is not under any substantial stress and is secured against any undesirable deformation which might undesirably influence the insulation.

With this construction of the invention the mounting and assembly of the elements, as compared to conventional switch assemblies of this type, is considerably less expensive and can be carried out in a quicker and far more convenient manner, and the same is true when it is necessary to change any of the parts.

It will be understood that each of the elements described above, or two or more together, may also find a useful application in other types of electrical assemblies differing from the types described above.

While the invention has been illustrated and described as embodied in electrical switch assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an ignition interruptor switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member, and said tubular spacer member having a length at least as long as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member.

2. In an ignition interruptor switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member and surrounded by said annular member, and said tubular spacer member having a length at least as long as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member, said annular member being made of a thermoplastic material.

3. In an ignition interruptor switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member, and said tubular spacer member having a length at least as long as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member, said annular member being made of a thermoplastic synthetic resin.

4. In an ignition interruptor switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member, and said tubular spacer member having a length at least as long as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member, said tubular spacer member being made of metal.

5. In an ignition interruptor switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member, and said tubular spacer member having a length at least as long as said annular member; a pair conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member, said tubular spacer member being made from a piece of metal which is rolled into a tubular configuration.

6. In an ignition interruptor switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member, and said tubular spacer member having a length at least as long as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member, said annular member being made of a thermoplastic material in the form of a die casting molded directly onto said wall.

7. In an internal combustion engine interruptor, in combination, a stationary contact-carrying element having a wall portion formed with an opening passing therethrough; an annular thermoplastic electrically non-conductive member fixedly carried by said wall portion and passing through said opening thereof; a tubular spacer member located in the interior of said annular member, extending therethrough, and being at least as long as said annular member; a movable contact-carrying element; means mounting said movable element for movement with respect to said stationary element, said elements respectively carrying a pair of contacts; leaf spring means located adjacent one end of said tubular spacer member and operatively connected to said movable contact-carrying element for forming part of the electrical circuit which includes the contact carried by said movable element; an electrical conductor located adjacent the opposite end of said spacer member; and bolt means fixing said spring and conductor to said spacer member without stressing said annular member so that current will flow from said conductor through said bolt means to said leaf spring, whereby said annular member will not, due to any change in the condition thereof, influence the electrical circuit.

8. In an internal combustion engine interruptor, in combination, a stationary contact-carrying element having a wall portion formed with an opening passing therethrough; an annular thermoplastic electrically non-conductive member fixedly carried by said wall portion and passing through said opening thereof; a tubular spacer member located in the interior of said annular member, extending therethrough, and being at least as long as said annular member; a movable contact-carrying element; means mounting said movable element for movement with respect to said stationary element, said elements respectively carrying a pair of contacts; leaf spring means located adjacent one end of said tubular spacer member and operatively connected to said movable contact-carrying element for forming part of the electrical circuit which includes the contact carried by said movable element; an electrical conductor located adjacent the opposite end of said spacer member; and bolt means fixing said spring and conductor to said spacer member without stressing said annular member so that current will flow from said conductor through said bolt means to said leaf spring, whereby said annular member will not, due to any change in the condition thereof, influence the electrical circuit, said tubular spacer member respectively having its opposite ends located slightly beyond opposed end faces of said annular member.

9. In a switch assembly adapted to be used in an internal combustion engine interruptor or the like, in combination, an electrically conductive wall formed with an opening passing therethrough; an annular electrically non-conductive member fixedly carried by said wall and passing through said opening thereof; a tubular spacer member located within, extending through and surrounded by said annular member, and said tubular spacer member having a length at least as long as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member, said spacer member respectively having opposed end faces located slightly beyond opposed end faces of said annular member, respectively.

10. In an ignition interruptor switch assembly for an internal combustion engine, in combination, an electrically conductive wall formed with an opening passing therethrough; an annular electrically non-conductive member of thermoplastic material, carried by said wall and passing through said opening thereof and molded directly onto said wall; a tubular spacer member located within and surrounded by said annular member, said tubular spacer member extending through and having a length at least as great as said annular member; a pair of conductors respectively located adjacent the ends of said tubular spacer member; and bolt means passing through said tubular spacer member and fixing said conductors thereto without stressing said annular member so that said conductors are insulated by said annular member from said wall and so that the connection of said conductors to said spacer member will be uninfluenced by changes in the condition of said annular member.

References Cited by the Examiner

UNITED STATES PATENTS

| | | | |
|---|---|---|---|
| 1,726,745 | 9/29 | Kulka | 18—59 |
| 2,480,523 | 8/49 | Tubbs | 174—153 |
| 2,559,568 | 7/51 | Hooven | 200—30 |
| 2,788,386 | 4/57 | McCarty | 174—153 |
| 2,851,546 | 9/58 | Phelon et al. | 200—30 |
| 2,875,306 | 2/59 | Allen | 200—168 |
| 2,893,722 | 7/59 | Beck | 174—153 |
| 2,904,845 | 9/59 | Sperry | 18—59 |
| 2,993,262 | 7/61 | Ross et al. | 29—155.5 |
| 2,999,302 | 9/61 | Beukema et al. | 29—155.5 |

FOREIGN PATENTS

| | | |
|---|---|---|
| 855,558 | 2/40 | France. |
| 850,751 | 10/60 | Great Britain. |
| 862,731 | 3/61 | Great Britain. |

ROBERT K. SCHAEFER, *Acting Primary Examiner.*

RICHARD M. WOOD, MAX L. LEVY, BERNARD A. GILHEANY, *Examiners.*